(12) United States Patent
Epureanu (10) Patent No.: US 9,688,264 B2
(45) Date of Patent: Jun. 27, 2017

(54) REGENERATIVE DIFFERENTIAL POWERTRAIN WITH VIBRATION ABSORPTION AND ISOLATION

(71) Applicant: Bogdan I. Epureanu, Ypsilanti, MI (US)

(72) Inventor: Bogdan I. Epureanu, Ypsilanti, MI (US)

(73) Assignee: The Regents of the University of Michigan, University of Michigan Office of Technology Transfer, Ann Arbor, MI (US)

( * ) Notice: Subject to any disclaimer, the term of this patent is extended or adjusted under 35 U.S.C. 154(b) by 139 days.

(21) Appl. No.: 14/504,935

(22) Filed: Oct. 2, 2014

(65) Prior Publication Data
US 2015/0094189 A1    Apr. 2, 2015

Related U.S. Application Data

(60) Provisional application No. 61/885,814, filed on Oct. 2, 2013.

(51) Int. Cl.
*B60K 1/02* (2006.01)
*B60W 10/08* (2006.01)
(Continued)

(52) U.S. Cl.
CPC ............. *B60W 10/08* (2013.01); *B60L 11/12* (2013.01); *B60W 20/14* (2016.01); *H02K 1/00* (2013.01);
(Continued)

(58) Field of Classification Search
CPC ............... B60W 10/08; B60W 20/14; B60W 2510/244; H02K 1/00; H02P 5/747; H02P 3/14; B60L 11/12
See application file for complete search history.

(56) References Cited

U.S. PATENT DOCUMENTS 5,675,203 A    10/1997  Schulze et al.
5,791,426 A *   8/1998  Yamada ................... B60K 6/26
                                                180/65.24
(Continued)

FOREIGN PATENT DOCUMENTS

EP        1783021 A3    5/2010
WO     2011138548 A2   11/2011

OTHER PUBLICATIONS

International Search Report and Written Opinion from PCT/US2014/058746, Jan. 22, 2015, WO.
(Continued)

*Primary Examiner* — David J Hlavka
(74) *Attorney, Agent, or Firm* — Lempia Summerfield Katz LLC (57) ABSTRACT

A vehicular system includes a crankshaft, a drive shaft, a plurality of electromagnetic machines mechanically coupling the crankshaft to the drive shaft, a power controller electrically coupled to the plurality of electromagnetic machines and configured to control current and/or voltage provided to, or received from, each electromagnetic machine of the plurality of electromagnetic machines, a supervisory controller communicatively coupled with the power controller and configured to establish an operational mode for the power controller, and a storage device electrically coupled to the power controller to store energy captured by the power controller.

22 Claims, 5 Drawing Sheets

(51) Int. Cl.
B60L 11/12 (2006.01)
H02K 1/00 (2006.01)
H02P 5/747 (2006.01)
B60W 20/14 (2016.01)
H02P 3/14 (2006.01)

(52) U.S. Cl.
CPC ....... *H02P 5/747* (2013.01); *B60W 2510/244* (2013.01); *H02P 3/14* (2013.01); *Y10S 903/947* (2013.01); *Y10T 477/23* (2015.01)

(56) References Cited

U.S. PATENT DOCUMENTS

| | | | | |
|---|---|---|---|---|
| 5,804,934 | A * | 9/1998 | Yamada | B60K 6/26 318/34 |
| 5,936,312 | A * | 8/1999 | Koide | B60K 6/26 290/38 R |
| 5,973,460 | A * | 10/1999 | Taga | B60K 6/26 318/139 |
| 6,087,734 | A * | 7/2000 | Maeda | B60K 6/40 180/65.21 |
| 6,356,817 | B1 * | 3/2002 | Abe | B60K 6/445 290/40 A |
| 8,387,762 | B2 | 3/2013 | Kondo et al. | |
| 2001/0004027 | A1 | 6/2001 | Masaki | |
| 2003/0173124 | A1 | 9/2003 | Okada et al. | |
| 2008/0236915 | A1 | 10/2008 | Schulze et al. | |
| 2010/0113213 | A1 * | 5/2010 | Oba | B60K 6/445 477/5 |
| 2012/0238387 | A1 | 9/2012 | Stuart | |
| 2012/0265382 | A1 | 10/2012 | Nefcy et al. | |

OTHER PUBLICATIONS

International Preliminary Report on Patentability in corresponding International Patent Application No. PCT/US2014/058746, dated Apr. 14, 2016, 12 pages.

* cited by examiner

REGENERATIVE DIFFERENTIAL POWERTRAIN WITH VIBRATION ABSORPTION AND ISOLATION

This application claims priority under 37 C.F.R. §1.19(e) to U.S. Provisional Patent Application Ser. No. 61/885,814, filed Oct. 2, 2013.

FIELD

The disclosure relates generally to hybrid electric vehicles and powertrains.

BACKGROUND

A powertrain of an automobile or other vehicle generates power for delivery of motive force. In a conventional automobile, the powertrain often includes an internal combustion engine and a transmission. The powertrain may also be considered to include components of a vehicle driven by the engine and transmission, or drivetrain. The drivetrain of an automobile typically includes a drive shaft, one or more differentials, one or more axles, and wheels.

Hybrid vehicles use multiple sources of power to move the vehicle. The power sources typically combine an internal combustion engine and an electric motor system. The electric motor system often includes a set of batteries to drive one or more electric motors. An electric motor of a hybrid vehicle may be configured for operation as a generator during a regenerative braking mode to store energy in the batteries for later use.

Hybrid and other automobile vehicles are often configured with an internal combustion engine with a low number of cylinders. An engine with only a single cylinder (or other engines with few cylinders) may provide better fuel efficiency while remaining relatively simple and economical in construction.

Engines with few cylinders unfortunately exhibit large fluctuations in torque over each cycle of operation. The resulting output torque may have as high as 70% variation compared to its mean. The fluctuations in torque lead to large torsional vibrations that propagate through the powertrain. Devices are typically placed along the powertrain to absorb the torsional vibrations. For example, a flywheel or damper may be mounted on a drive shaft or placed at other locations along the kinematic chain of the vehicle.

Incorporation of the absorption devices undesirably increases the complexity of engines with few cylinders. Despite the increased complexity, the energy dissipated by the devices is nonetheless wasted.

SUMMARY

In an aspect a vehicular system includes a crankshaft and a drive shaft. The vehicular system also includes a plurality of electromagnetic machines coupling the crankshaft to the drive shaft. The vehicular system also includes a power controller electrically coupled to the plurality of electromagnetic machines and configured to control power flowing through each electromagnetic machine of the plurality of electromagnetic machines. The vehicular system also includes a supervisory controller communicatively coupled with the power controller and configured to establish an operational mode for the power controller, and a storage device electrically coupled to the power controller to store energy captured by the power controller.

In an aspect, a vehicle includes an internal combustion engine having a crankshaft. The vehicle also includes a drivetrain having a drive shaft coupled to the crankshaft by an electromechanical hub. The electromechanical hub is configured to provide a differential in angular velocity between the crankshaft and a drive shaft, the electromechanical hub having a plurality of electromagnetic machines electromagnetically coupling the crankshaft to the drive shaft, and a power controller electrically coupled to the plurality of electromagnetic machines and including power electronic circuitry configured to control power provided to, or received from, each electromagnetic machine of the plurality of electromagnetic machines. The vehicle also includes a supervisory controller communicatively coupled with the power controller having a processor configured to determine an operational mode for the power controller, and a storage system electrically coupled to the power controller to store energy captured by the power controller.

In an aspect, a method of controlling a vehicle drivetrain includes obtaining data indicative of a torque of a crankshaft of an internal combustion engine. The method also includes controlling a respective current or voltage of one or more of a plurality of electromagnetic machines coupling the crankshaft to a drive shaft based on the obtained data to dampen torsional vibrations of the crankshaft, and capturing energy generated by a respective one of the plurality of electromagnetic machines.

BRIEF DESCRIPTION OF THE DRAWING FIGURES

For a more complete understanding of the disclosure, reference should be made to the following detailed description and accompanying drawing figures, in which like reference numerals identify like elements in the figures.

While the disclosed systems and methods are susceptible of embodiments in various forms, there are illustrated in the drawing (and will hereafter be described) specific aspects of the invention, with the understanding that the disclosure is intended to be illustrative, and is not intended to limit the invention to the specific embodiments described and illustrated herein.

DETAILED DESCRIPTION

The disclosure relates to vibration absorption and regenerative controllable powertrains in hybrid electric vehicles (HEVs). Described herein are systems that may be operative as a regenerative vibration absorber and/or a controllable differential or transmission. The disclosed systems may control the output torque and angular velocity (e.g., revolutions per minute, or rpm) as desired by the vehicle driver while transforming the unused torque/power into electrical energy to charge a capacitor or a battery or while supplying additional toque/power from a battery or a capacitor. The disclosed systems may thus be configured as an electromechanical hub for a vehicle. The electromechanical hub controls the flux of torque/power in the powertrain. The electromechanical hub may include a series of electromagnetic machines embedded in the drivetrain. These machines are coupled electromagnetically and mechanically.

The electromagnetic machines may be coupled in a variety of arrangements. For example, one or more (e.g., two) of the electromagnetic machines may be disposed in a concentric arrangement in which respective armatures of each electromagnetic machine are coupled to one another radially. Alternatively or additionally, one or more (e.g., two) electromagnetic machines may be disposed in a laterally sequential arrangement in which respective armatures of each electromagnetic machine are coupled to one another frontally. Alternatively or additionally, one or more (e.g., two) electromagnetic machines may be disposed in a sequential arrangement in which respective armatures of each electromagnetic machine are coupled to one another radially. Various combinations of these arrangements may be used.

The disclosed systems may be configured to capture the energy of the torsional vibrations that would be otherwise dissipated in other drivetrains. The captured energy may then be used to charge batteries, capacitors, and/or other energy storage units of the vehicle.

The disclosed systems are not limited to use as regenerative vibration absorbers. The disclosed systems may be alternatively or additionally used or configured as a controllable differential device. For example, angular velocity differential functionality provided by the disclosed systems may replace the typically mechanical gears of a vehicle. The disclosed systems may be operative to control the output torque and/or output angular velocity (rpm) as desired by the vehicle driver while transforming the unused or harnessed torque/power into electrical energy to power an electrical drive directly and/or provide a charge to a capacitor or battery. The disclosed systems may also control the output torque and angular velocity (rpm) as desired by the vehicle driver while supplying additional torque/power from a battery or a capacitor. In these and other ways, the disclosed systems may include or be configured as an electromechanical hub. The hub may control the flux of torque/power in the powertrain of a vehicle. The disclosed systems may thus be configured for operation in a variety of modes, including a vibration suppression mode, a transmission mode, a differential mode, a hybrid drive mode, a charging mode, an electric-only drive mode, and combinations thereof.

Figure 1:
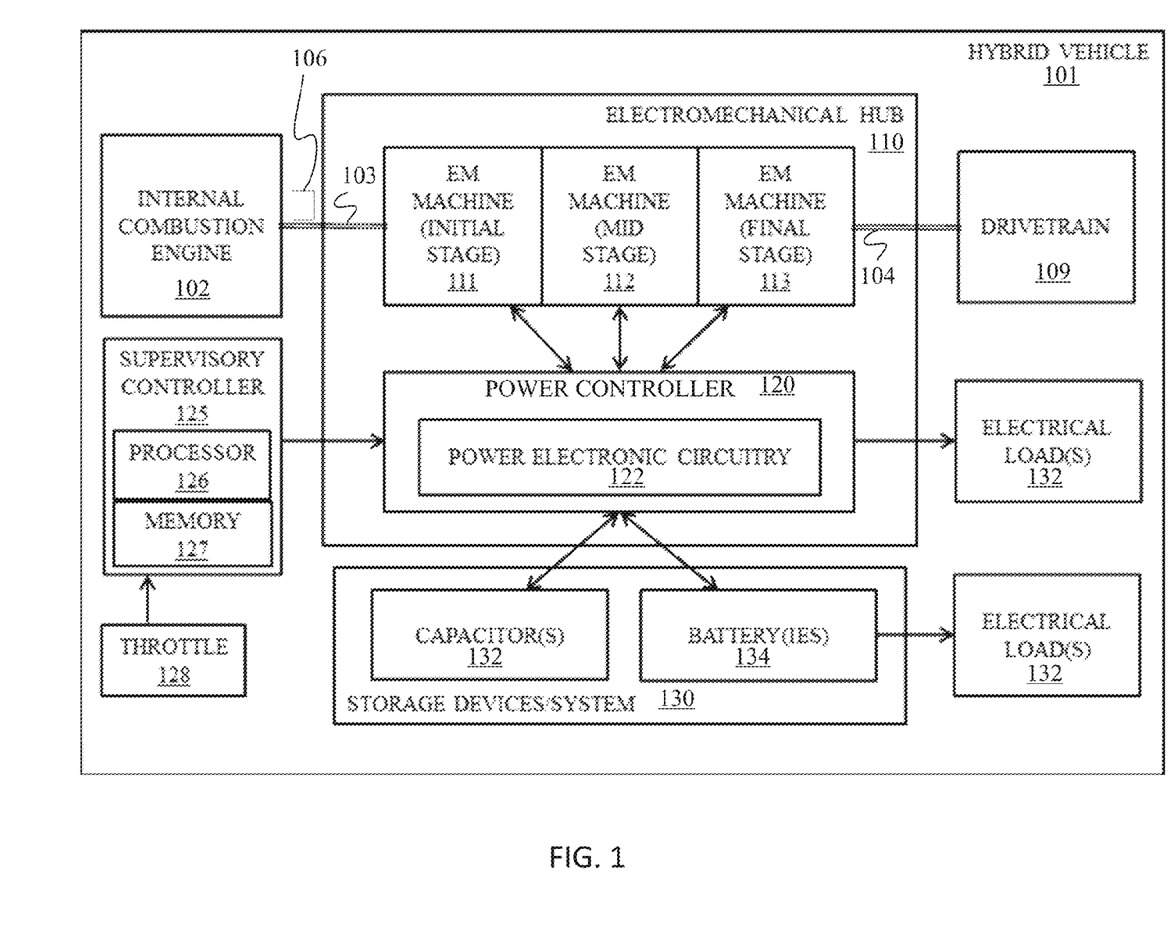
FIG. 1 is a block diagram of an exemplary vibration absorption and regenerative differential/transmission system in accordance with one aspect.

With reference to the drawing figures, FIG. 1 depicts a hybrid vehicle 101 having an internal combustion engine (ICE) 102, an electromechanical hub 110 mechanically coupled to the internal combustion by a crankshaft 103, a drivetrain 109 mechanically coupled to the electromechanical hub 110 by a drive shaft 104, and a supervisory controller 125 to control operation of the electromechanical hub 110, an electrical energy storage system 130, and a number of electrical loads 132. The electromechanical hub 110 includes a plurality of electromagnetic machines 111, 112, and 113. In this example, three machines 111, 112, and 113 are provided. An input or initial stage machine 111 is mechanically coupled to the crankshaft 103. An output or final stage machine 113 is mechanically coupled to the drive shaft 104. In one aspect, a mid-stage machine 112 electromagnetically couples the initial and final stage machines or the mid-stage machine 112 may electromagnetically couple the crankshaft 103 and the drive shaft 104. In an electromagnetic coupling there may be no mechanical coupling connecting the machines or the shafts, but instead electromagnetic forces provided by the mid-stage machine 112 may provide the coupling. The electromechanical hub 110 may also include, a power controller 120 configured to control current and/or voltage flowing through the electromagnetic machines 111, 112, and 113.

In one aspect, a mid-stage machine 112 electromagnetically and mechanically coupled to the other electromagnetic machines 111 and 113. For example, the mid-stage machine 112 may be coupled with the initial stage machine 111 and/or the final stage machine 113 using intermediate shafts 105 along with optional mechanical coupling devices to allow for proper rotational operation of the system. This mechanical coupling may allow the electromagnetic machines 111, 112, and 113 to be placed at different physical locations throughout a vehicle, but still be connected to allow for the electromagnetic coupling of the crankshaft 103 to the drive shaft 104 using the mid-stage machine 112. For example, the initial stage machine 111 may be physically attached to the body of the ICE and coupled with the mid-stage machine 112 such that the mid-stage machine 112 is physically located near an axle of the vehicle 101. Thus, in some cases, the mid-stage machine 112 and the initial stage machine 112 are not physically adjacent to each other, but are still coupled. The electromechanical hub 110 may be configured to provide a differential in angular velocity between a crankshaft and a drive shaft. The electromechanical hub 110 may alternatively, or additionally, be configured to dampen vibrations of the crankshaft. Also, the electromechanical hub may alternatively, or additionally, be configured to drive, or otherwise provide power to, the drive shaft 104.

The crankshaft 103 may be a crankshaft of the ICE 102. Alternatively, the crankshaft 103 may be a shaft coupled or linked to the crankshaft of the ICE 102. Similarly, the drivetrain 111 and the electromechanical hub 110 may share the drive shaft 104 or have respective drive shafts coupled or linked to one another. Further, as described above, the three machines 111, 112, and 113 may be spaced and/or located at various locations throughout the drivetrain 109. For example, the final stage machine 113 may be located adjacent to a differential, or further along the drive train 109 such as at a wheel hub.

Each electric machine 111, 112, and 113 may be operated as an electric motor, an electric generator, or in a bypass mode in which power is neither added nor captured by the machine. The operation of each machine is controlled by a power controller 120 of the electromechanical hub 110. The power controller 120 may include a current controller, a voltage controller, or both. The power controller 120 may include power electronic circuitry 122 to control the application of power to, or the reception of power from, each machine 111, 112, and 113 and/or control the capture of power from each machine 111, 112, and 113.

The initial stage machine 111 may operate as a torsional vibration dampener through an application of dampening torque to the crankshaft 103 to account for and/or counter the variations of output torque across an ICE 102 piston cycle. The torque may be applied with an electromechanical operation of the initial stage machine 111 as controlled by the power controller 120 described below. In one aspect, the crankshaft may also have a sensor 106 positioned to determine a rotational position and/or output torque of the crankshaft 103. The dampening torque to be applied at any given angular position of the crankshaft 103 may be determined using the sensor 106. For example, the sensor 106 may measure torque of the shaft. The initial stage machine 111 may then vary the dampening torque accordingly to account for the variations in torque of the crankshaft throughout the various angular positions of a piston cycle by directly accounting for the variations of torque detected by the sensor 106. In another example, the sensor 106 may capture or detect an angular position of the crankshaft 103. The output torque of the ICE 102 may be determined based on the angular position. For example, torque values may be mapped and associated with respective angular positions of a rotation of the crankshaft 103. This map and the angular position readings of the sensor 106 may be used to determine and control the dampening torque applied to the crankshaft 103 by the initial stage machine 111.

An electric machine, such as the initial stage machine 111, operating in a vibration suppression mode, or as a torsional vibration dampener, may also capture energy of the crankshaft 103 torsional vibrations, thus operating as a generator. For example, at certain angular positions throughout the crankshaft 103 cycle the torque generated by the ICE 102 may be higher than at other positions of the cycle, and possibly equal to or higher than the desired dampening torque intended to account for the variance of torque throughout the cycle. At these higher torque positions, energy may be captured using an electric machine operating in a vibration dampening mode, as the ICE 102 generated torque is driving the electric machine, resulting in a net positive power gain that may be stored in a storage device 130, or used by other electric machines or electrical loads 132 of the vehicle 101. At the positions having lower crankshaft torque, energy may be supplied by the electric machine to maintain the torque levels and dampen the torsional vibrations. In an example, the electric machine operating as a torsional vibration dampener may be operated with a dampening torque at a level that matches the highest torque output at angular positions of the crankshaft 103. In this example, any energy supplied by the torsional vibration due to torque variations may be captured by the electric machine.

Any combination of electric machines 111, 112, and 113 may be used. In an example, only the mid-stage machine 112 and the final stage machine 113 may be used. In this example, the mid-stage machine 112 may be operational to adjust or otherwise control the angular velocity of the drive shaft 104. Any power generated from the angular velocity control, may be processed using the power electronic circuitry 122 of the power controller 120 to meet the power requirements of the final stage machine 113. An example of velocity control to generate power may be a step-down in the angular velocity of the crankshaft 103 to the drive shaft 104 using the mid-stage machine 112. The mid-stage machine 112 may provide power directly to the final stage machine 113 for the application of torque to the drive shaft 104. This power generated by the mid-stage machine 112 may be supplied to the final stage machine 113 with or without the use of the storage device/system 130 to store the generate power.

The power controller 120 is communicatively coupled to a supervisory controller 125 configured to establish or determine an operational mode for the electromechanical hub 110. The supervisory controller 125 may generate or determine control signals based on various drive control inputs. For example, the supervisory controller 125 may receive an input signal or data representative of a throttle input 128 indicative of a desired power, torque, or speed output of the vehicle 101. The power controller 120 may be responsive to the one or more control signals developed by the supervisory controller 125. In some aspects, the supervisory controller 125 may include a processor 126 and a memory 127 in which instructions for the processor 126 are stored. The supervisory controller 125 may include one or more digital controllers.

The energy storage system (or device) 130 may have any number of storage devices for storing energy captured by the electromechanical hub 110. In this example, the energy storage system 130 includes one or more capacitors 132 and one or more batteries 134.

Figure 2:
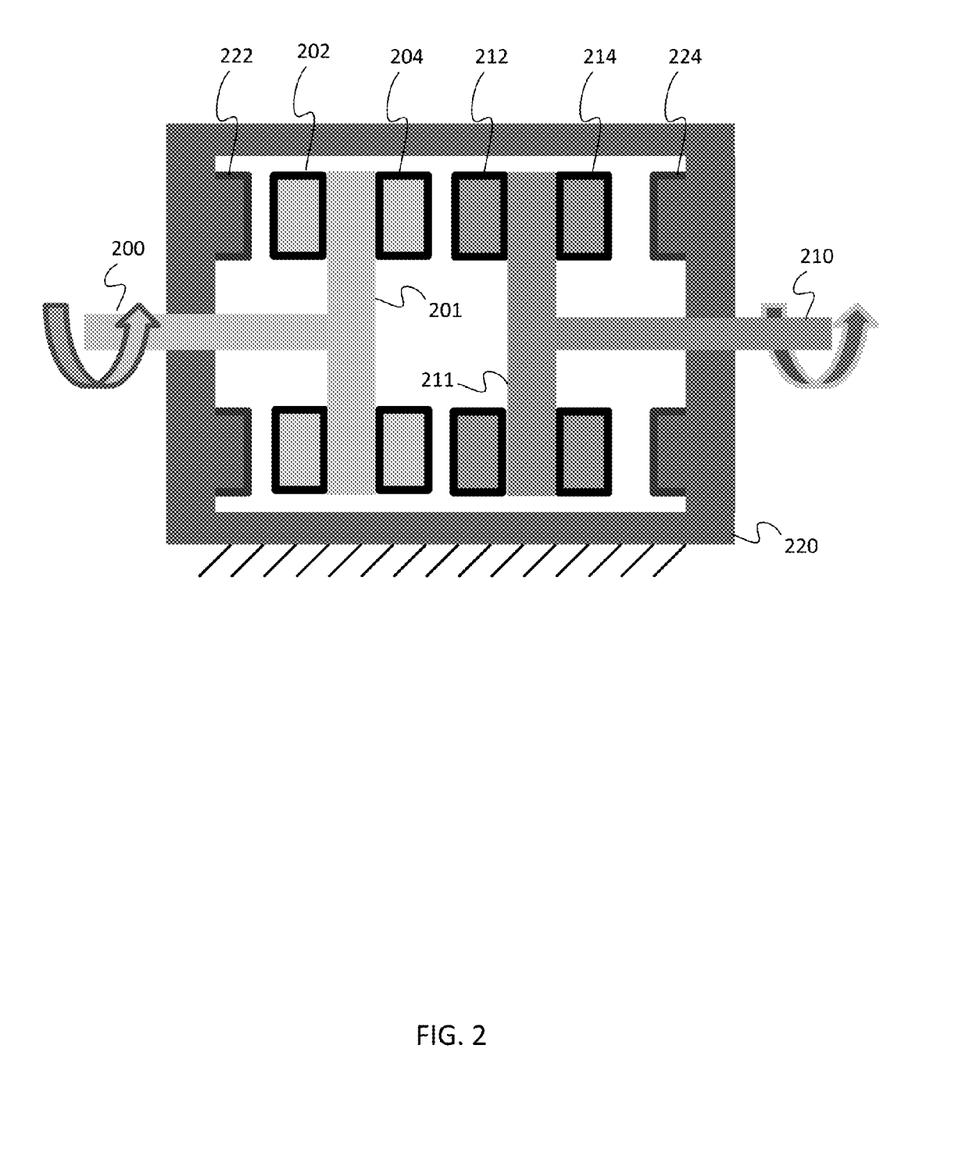
FIG. 2 is a schematic diagram of an exemplary electromechanical hub of the system of FIG. 1 with frontal sequential electromagnetic coupling in accordance with one aspect.
Figure 3:
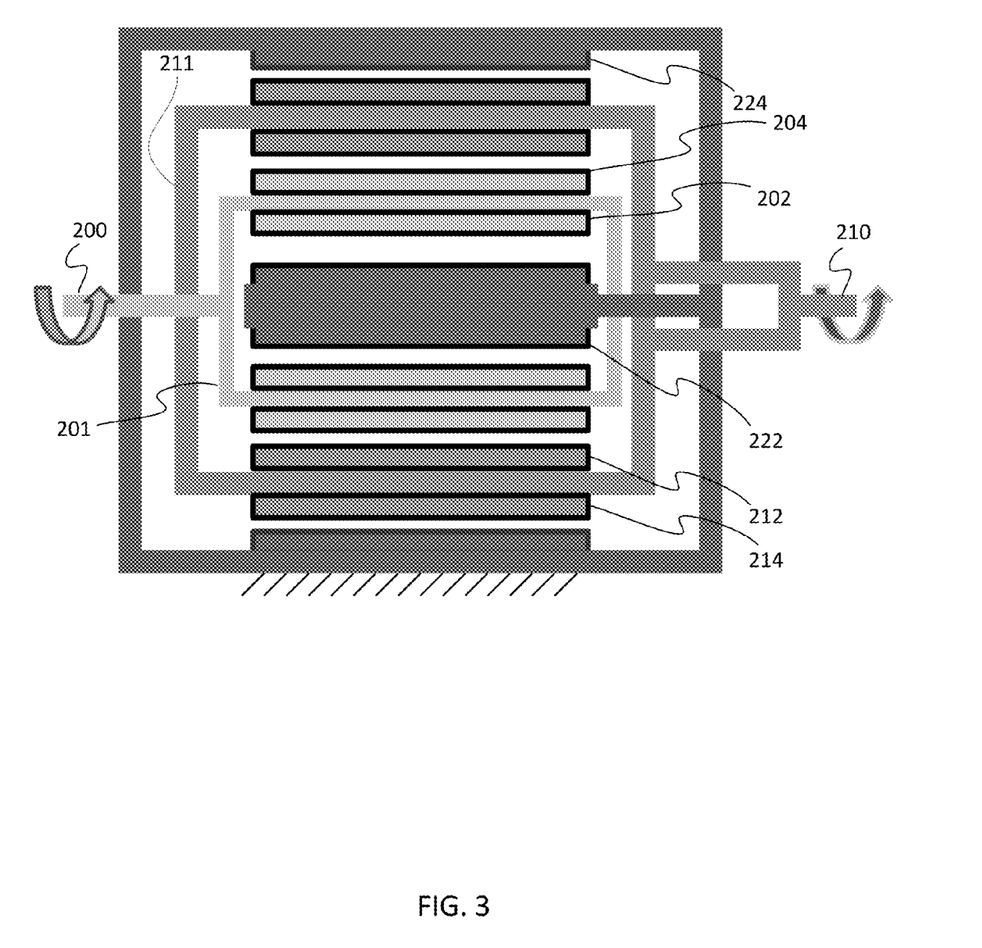
FIG. 3 is a schematic diagram of an exemplary electromechanical hub of the system of FIG. 1 with radial concentric electromagnetic coupling in accordance with one aspect.
Figure 4:
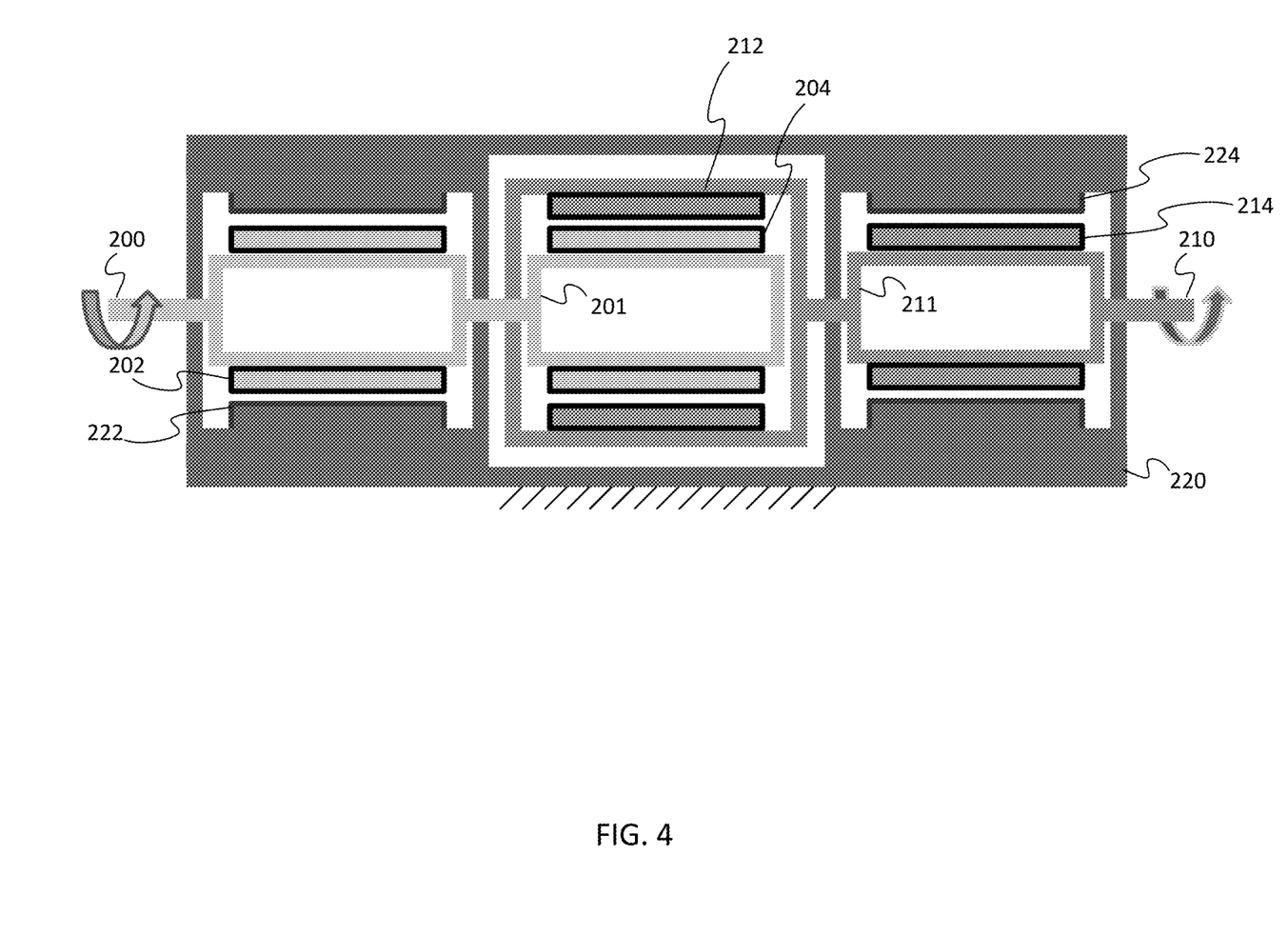
FIG. 4 is a schematic diagram of an exemplary electromechanical hub of the system of FIG. 1 with radial sequential electromagnetic coupling in accordance with one aspect.

With reference to FIGS. 2-4, the electromechanical hub may include a plurality (e.g., three) of electrical or electromagnetic machines. The machines may be arranged in various architectures. FIG. 2 depicts an architecture in which armatures of each machine are disposed in a lateral or frontal sequential arrangement. FIG. 3 depicts an architecture in which armatures of each machine are disposed in a radial concentric arrangement. FIG. 4 depicts an architecture in which armatures of each machine are disposed in a radial sequential arrangement. Other architectures may be used. For example, an architecture may involve a combination of frontal and radial arrangements, where each of the machines may have armatures either radially or frontally arranged, and the radial machines may be concentrically arranged or sequential with respect to one another.

As shown in FIGS. 2-4, the electromechanical hub of the disclosed systems may include a number of sub-assemblies. An input or crankshaft assembly 200 is coupled to an internal combustion engine (ICE). The crankshaft assembly 200 further includes a radial arm 201 or other support that carriers multiple armatures 202 and 204 (e.g., one on each of the radial supports) of the initial stage machine 111 and the mid-stage machine 112 (described further below). A downstream or drivetrain shaft assembly 210 includes a radial arm 211 or other support that carriers armatures 212 and 214 of the mid-stage machine 112 and the final stage machine 113. A stator assembly 220 includes a housing 221 or other support structure upon which stator armatures 222 of the first stage machine 111 and stator armature 224 of the and final stage machine 113 are mounted. The housing 221 may be co-mounted with the ICE 102.

The shaft assemblies 200 and 210 are electromagnetically coupled and interacting through the electromagnetic fields developed by, or in connection with, the respective machines. Taken together, armatures of the shaft assemblies 200 and 210 form a regenerative electrical machine. Similarly, armatures of the shaft assembly 210 and the support structure 220 are also interacting through another electromagnetic field. Taken together, the armatures 214 and 224 of the shaft assembly 210 and the support structure 220 form another regenerative electrical machine. Similarly, armatures 202 and 222 of the shaft assembly 200 and the support structure 220 interact through another electromagnetic field and form another electrical machine.

The electromechanical hub may thus include a system or arrangement of three electric or electromagnetic machines. The machines may be disposed in one of the nested arrangements shown in FIGS. 2-4, or in a different arrangement. Fewer than three electrical machines may be incorporated into the electromechanical hub. For example, in some aspects, a final stage machine 113 may be removed and the drivetrain shaft assembly 210 may include an armature for both the initial stage and mid-stage machines 111 and 112. In other aspects, the initial stage machine 111 may be removed and the crankshaft assembly 200 may include a single armature for both the mid-stage and final stage machines 112 and 113.

The machines are coupled to the ICE 102, to the storage device 130 (e.g., battery), and to other (downstream) elements of the powertrain. The electrical currents and/or voltages to the armatures of the crankshaft assembly 200, the drive shaft assembly 210, and the stator assembly 220 are controlled by the power controller 120, which, in turn, is directed by the supervisory controller 125. By controlling these currents and/or voltages, the angular velocity of the crankshaft 103 and the angular velocity of the driveshaft 104 may be controlled and/or set independently. Hence, the electromechanical hub may be configured to operate as a differential where the input shaft (103) and the output shaft (104) have distinct angular velocities (rpm) and/or are otherwise controlled independently.

The construction of the armatures may vary. In some aspects, the armatures on the drive shaft assembly 210, and the stator assembly 220 may be permanent magnets.

The disclosed systems may be configured for operation in one of several modes. The disclosed systems may be configured for operation as a regenerative differential powertrain with embedded vibration suppression and isolation. Torsional vibrations may be suppressed through the operation of any one or more of the electromagnetic machines. The disclosed systems may be configured for operation in a drive mode as a differential through independent control of both the input shaft and the output shaft. Such independent control may be accomplished through control of electric currents and/or voltages to the plurality of machines.

In one drive mode of operation, the drivetrain is driven only with power from the storage device 130 (i.e., without power from the ICE). For example, power may be provided via the final stage machine 113. In another drive mode, the drivetrain is driven by both power from the ICE 102 and the storage device 130. In such cases, the initial stage machine 111 may be controlled to suppress or remove torsional vibrations (e.g., configured to provide smoothing), the machine mid-stage machine 112 may couple the initial and final stage machines, and the final stage machine 113 may provide additional torque. In some cases, the initial stage machine 111 may also provide torque. In another drive mode, power from the ICE 102 is used to charge the storage devices 130 and drive the drivetrain 109. In such cases, the initial stage machine 111 may be inoperable or provide smoothing, the mid-stage machine 112 may provide smoothing, and the final stage machine 113 may charge the storage device 130. In yet other drive modes, the machines may be controlled to act as a differential or transmission device. The mid-stage machine 112 may provide slippage between the input and output shafts and/or allow the shafts to have different angular velocities (rpm) and/or torque levels.

The exemplary armature arrangements shown in FIGS. 2-4 provide different options for incorporating the disclosed systems into a vehicle. The frontal or lateral arrangement of FIG. 1 provides a relatively compact system, but at the expense of lower surface area in the armature windings, which may lead to less electromagnetic coupling and, thus, reduced torque. The concentric radial arrangement of FIG. 2 is a relatively short, but radially wider arrangement that increases the winding surface area and, thus, electromagnetic coupling. The concentric arrangement may, however, lead to increased interference between non-adjacent armatures. The concentric arrangement may also include or involve a double or other bearing structure to allow the shafts to enter and exit a consolidated electromechanical hub. The radial sequential arrangement of FIG. 3 may exhibit relatively good coupling with less interference, but at the expense of increased length.

The supervisory controller 125 of the disclosed systems may include one or more processors, such as, a central processing unit (CPU). The supervisory controller may thus include multiple controllers or processors for respectively controlling, directing, or otherwise communicating with one or more of the above-described system components (e.g., the power controller 120). Other components, such as the power controller 120, may also include one or more processors.

The processor 126 of the supervisory controller 125 may be a component in a variety of systems. The processor 126 may be one or more general processors, digital signal processors, application specific integrated circuits, field programmable gate arrays, networks, digital circuits, analog circuits, combinations thereof, or other now known or later developed devices for analyzing and processing data. The processor may implement a software program, such as code generated manually (i.e., programmed).

The supervisory controller 125 may include a memory 127. The memory 127 may communicate via a bus. The memory 127 may be a main memory, a static memory, or a dynamic memory. The memory 127 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, and the like. In one case, the memory 127 may include a cache or random access memory for the processor. Alternatively or additionally, the memory may be separate from the processor, such as a cache memory of a processor, the system memory, or other memory. The memory 127 may be an external storage device or database for storing data. Examples may include a hard drive, memory card, memory stick, or any other device operative to store data. The memory may be operable to store instructions executable by the processor 126. The functions, acts or tasks illustrated in the figures or described herein may be performed by the programmed processor executing the instructions stored in the memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

Alternatively or additionally, dedicated hardware implementations, such as application specific integrated circuits, programmable logic arrays and other hardware devices, may be constructed to implement one or more of the control methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 5:
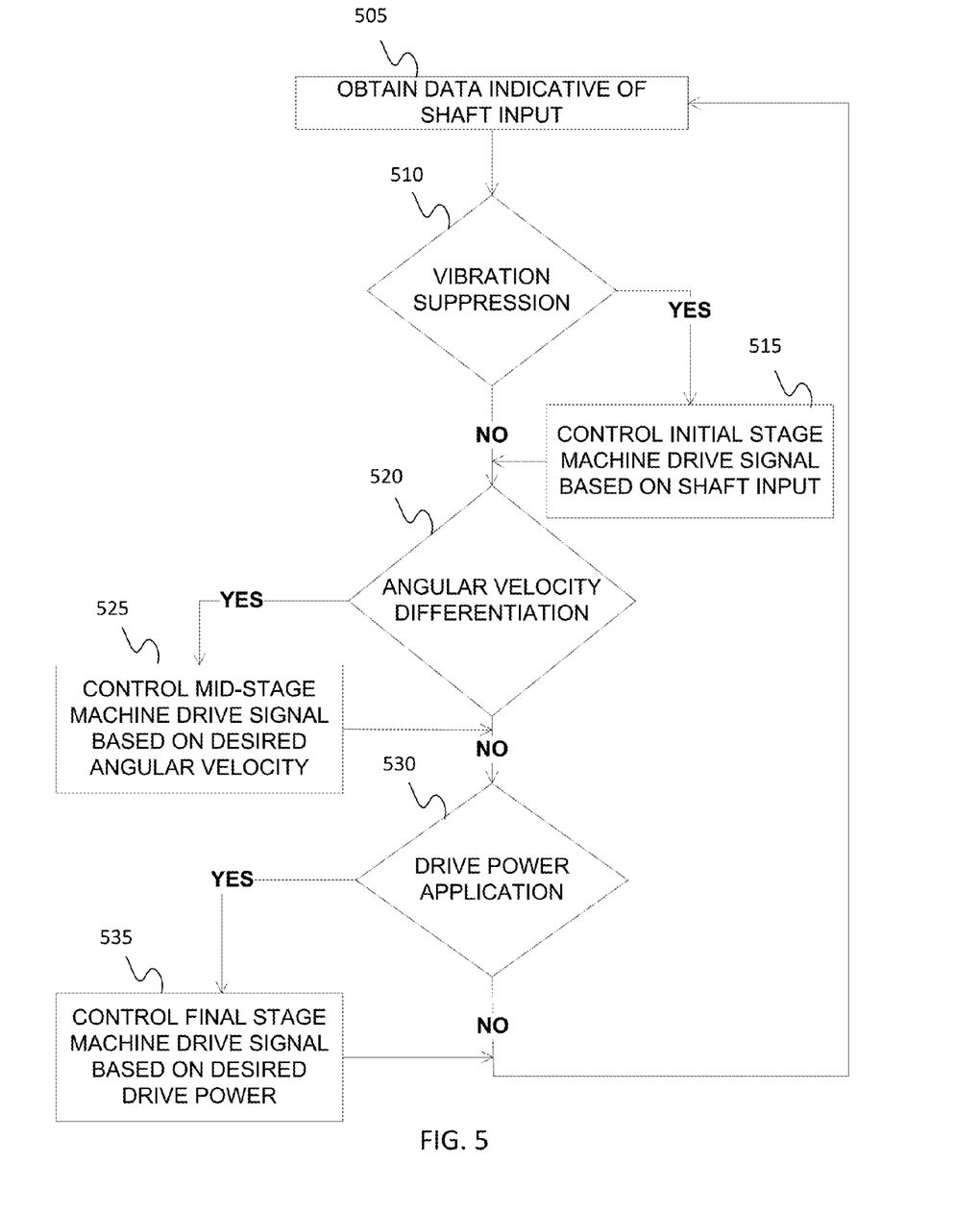
FIG. 5 is a flow chart diagram of a method for controlling a vehicle drive train.

FIG. 5 represents a flow chart diagram for a method of controlling a drive train of a vehicle. As presented in the following sections, the acts may be performed using any combination of the components indicated in FIG. 1. The following acts may be performed by the supervisory controller 125, the power controller 120, or a combination thereof. Additional, different, or fewer acts may be provided.

The acts are performed in the order shown or other orders. The acts may also be repeated.

Data may be received that indicates a shaft input (Block 505). The shaft input may be an input into a drive train control system. The data may be indicative of a torque of the shaft. The data may be data provided by a sensor, such as sensor 106 described with respect to FIG. 1. From this data a shaft torque at various rotational shaft positions may be determined. For example, the sensor data may indicate a position of the shaft, and a mapping of torque output for the shaft at various positions may be referenced to determine the shaft output. The data may be indicative of other shaft inputs as well. For example, the data may be indicative of an angular velocity of the shaft.

An operational mode may be determined for various components in a drive train control system. One of these modes may be a vibration suppression mode. For example, an initial stage machine may have the option to operate in a vibration suppression mode (Block 510). This vibration suppression mode may be operational to suppress vibrations of the shaft coupled with the initial stage machine. The initial stage machine may suppress vibrations by applying a torque to the shaft using electromagnetic forces generated by the initial stage machine. The amount of torque applied to the shaft may be determined by compensating for variations of a torque provided by the shaft throughout an angular rotation of the shaft. These variations in torque input may be determined using the obtained data indicative of shaft torque. Thus, the control of the initial stage machine may be based on the data indicative of shaft torque (Block 515). This vibration suppression may be provided using the structures described above with respect to the initial stage machine 111 of FIGS. 2-4.

Also, a mid-stage stage machine may have the option to operate in an angular velocity differentiation mode (Block 520). This angular velocity differentiation mode may be operational to change or vary an angular velocity between an input shaft coupled with the mid-stage machine and an output shaft coupled with the mid-stage machine. This variation in angular velocity may be achieved using an electromagnetic coupling of the input shaft and the output shaft across the mid-stage machine. For example, there may be no mechanical coupling between the input shaft and the output shaft, but the mid-stage machine may provide an electromagnetic coupling configured to allow for relative rotational movement of the input and output shafts based on a control of the mid-stage machine (Block 525). This relative rotational movement may be provided using the structures described above with respect to the mid-stage machine 112 of FIGS. 2-4.

Also, a final stage machine may have the option to operate in drive mode (Block 530). The final stage machine may be controlled to provide an output power to the output shaft (Block 535). The desired output power may be provided by any technique. For example, the throttle 128 of FIG. 1 may indicate a desired drive power. This drive mode may be operational to provide additional drive torque to an output shaft coupled with the final stage machine. This drive power may be provided using the structures described above with respect to the final stage machine 113 of FIGS. 2-4.

The method may be continuous, such that the acts are repeated in a continuous manner during to control the operation of the drive train in an ongoing manner.

In an aspect a vehicular system includes a crankshaft and a drive shaft. The vehicular system also includes a plurality of electromagnetic machines coupling the crankshaft to the drive shaft. The vehicular system also includes a power controller electrically coupled to the plurality of electromagnetic machines and configured to control power flowing through each electromagnetic machine of the plurality of electromagnetic machines. The vehicular system also includes a supervisory controller communicatively coupled with the power controller and configured to establish an operational mode for the power controller, and a storage device electrically coupled to the power controller to store energy captured by the power controller.

In an aspect, a vehicle includes an internal combustion engine having a crankshaft. The vehicle also includes a drivetrain having a drive shaft coupled to the crankshaft by an electromechanical hub. The electromechanical hub is configured to provide a differential in angular velocity between the crankshaft and a drive shaft, the electromechanical hub having a plurality of electromagnetic machines electromagnetically coupling the crankshaft to the drive shaft, and a power controller electrically coupled to the plurality of electromagnetic machines and including power electronic circuitry configured to control power provided to, or received from, each electromagnetic machine of the plurality of electromagnetic machines. The vehicle also includes a supervisory controller communicatively coupled with the power controller having a processor configured to determine an operational mode for the power controller, and a storage system electrically coupled to the power controller to store energy captured by the power controller.

In connection with any of the forgoing systems, vehicles, and/or other devices an aspect may provide that the plurality of electromagnetic machines a first electromagnetic machine includes a first stator armature and a first engine rotor armature driven by the crankshaft, a second electromagnetic machine including a second engine rotor armature driven by the crankshaft and a first drive rotor armature rotatably coupled to the drive shaft, and/or a third electromagnetic machine including a second drive rotor armature rotatably coupled to the drive shaft and a second stator armature, wherein the first and second stator armatures are fixedly mounted to an internal combustion engine that drives the crankshaft.

In connection with any of the forgoing systems, vehicles, and/or other devices an aspect may provide that the supervisory controller is configured to direct the current controller to operate the plurality of electromagnetic machines in a vibration suppression mode in which one or more of the electromagnetic machines lower or suppress torsional vibrations on the crankshaft.

In connection with any of the forgoing systems, vehicles, and/or other devices an aspect may provide that the supervisory controller is configured to direct the current controller in a generator operational mode to operate the plurality of electromagnetic machines to capture energy from torsional vibrations on the crankshaft for storage in the storage device.

In connection with any of the forgoing systems, vehicles, and/or other devices an aspect may provide that the supervisory controller is configured to direct the current controller in a drive operational mode to apply the captured energy stored in the storage device to one or more of the plurality of electromagnetic machines to drive the drive shaft.

In connection with any of the forgoing systems, vehicles, and/or other devices an aspect may provide that the supervisory controller is configured to direct the current controller to control an output torque provided on the drive shaft in the drive operational mode.

In connection with any of the forgoing systems, vehicles, and/or other devices an aspect may provide that the supervisory controller is responsive to a throttle input to determine a desired level of the output torque.

In connection with any of the forgoing systems, vehicles, and/or other devices an aspect may provide that the supervisory controller is configured to direct the current controller to control an angular velocity (rpm) of the drive shaft in the drive operational mode.

In connection with any of the forgoing systems, vehicles, and/or other devices an aspect may provide that the supervisory controller is responsive to a throttle input to determine a desired level of the angular velocity (rpm).

In connection with any of the forgoing systems, vehicles, and/or other devices an aspect may provide that the supervisory controller is configured to direct the current controller in the drive operational mode to operate at least one of the plurality of electromagnetic machines as a transmission device that allows the crankshaft and the driveshaft to rotate at different angular velocities (rpm).

In connection with any of the forgoing systems, vehicles, and/or other devices an aspect may provide that the supervisory controller is configured to direct the current controller in the drive operational mode to operate at least one of the plurality of electromagnetic machines as a differential device that allows slippage between the crankshaft and the driveshaft.

In connection with any of the forgoing systems, vehicles, and/or other devices an aspect may provide that the supervisory controller is configured to direct the current controller in the drive operational mode to operate a first machine of the plurality of electromagnetic machines to suppress torsional vibration on the crankshaft, to operate a second machine of the plurality of electromagnetic machines to couple power provided by the crankshaft to the drive shaft, and to operate a third machine of the plurality of electromagnetic machines to apply the captured energy to drive the drive shaft.

In connection with any of the forgoing systems, vehicles, and/or other devices an aspect may provide that the supervisory controller is configured to direct the current controller in the drive operational mode to operate a first machine of the plurality of electromagnetic machines to suppress torsional vibration on the crankshaft and/or couple power provided by the crankshaft to the drive shaft, and to operate a second machine of the plurality of electromagnetic machines to store energy provided by the crankshaft in the storage device.

In connection with any of the forgoing systems, vehicles, and/or other devices an aspect may provide that the supervisory controller is configured to direct the current controller in an electric-only drive operational mode to apply the captured energy stored in the storage device to one or more of the plurality of electromagnetic machines to drive the drive shaft without any power provided by the crankshaft.

In connection with any of the forgoing systems, vehicles, and/or other devices an aspect may provide that the plurality of electromagnetic machines may be disposed in a laterally sequential arrangement in which respective armatures of each electromagnetic machine are coupled to one another frontally.

In connection with any of the forgoing systems, vehicles, and/or other devices an aspect may provide that the plurality of electromagnetic machines are disposed in a concentric arrangement in which respective armatures of each electromagnetic machine are coupled to one another radially.

In connection with any of the forgoing systems, vehicles, and/or other devices an aspect may provide that the plurality of electromagnetic machines are disposed in a sequential arrangement in which respective armatures of each electromagnetic machine are coupled to one another radially.

In connection with any of the forgoing systems, vehicles, and/or other devices an aspect may provide that a first respective one or two of the electromagnetic machines are disposed in a concentric arrangement in which respective armatures of each electromagnetic machine are coupled to one another radially, and/or a second respective one or two of the electromagnetic machines are disposed in a laterally sequential arrangement in which respective armatures of each electromagnetic machine are coupled to one another frontally, and/or a third respective one or two of the electromagnetic machines are disposed in a sequential arrangement in which respective armatures of each electromagnetic machine are coupled to one another radially.

In connection with any of the forgoing systems, vehicles, and/or other devices an aspect may provide that the storage device includes a battery and a capacitor.

In an aspect, a method of controlling a vehicle drivetrain includes obtaining data indicative of a torque of a crankshaft of an internal combustion engine. The method also includes controlling a respective current or voltage of one or more of a plurality of electromagnetic machines coupling the crankshaft to a drive shaft based on the obtained data to dampen torsional vibrations of the crankshaft, and capturing energy generated by a respective one of the plurality of electromagnetic machines.

In connection with any of the forgoing method, an aspect may provide that the method further includes operating a first electromagnetic machine of the plurality of electromagnetic machines in a torsional dampening mode, the first electromagnetic machine fixably attached to the internal combustion engine and including a first stator armature and a first engine rotor armature driven by the crankshaft, operating a second electromagnetic machine of the plurality of electromagnetic machines in a differential mode such that a reduction in rotational speed between the crankshaft and the drive shaft is achieved, the second electromagnetic machine including a second engine rotor armature driven by the crankshaft and a first drive rotor armature rotatably coupled to the drive shaft, and/or operating a third electromagnetic machine of the plurality of electromagnetic machines in a drive mode such that torque is supplied to the drive shaft using the third electromagnetic machine, the third electromagnetic machine including a second drive rotor armature rotatably coupled to the drive shaft and a second stator armature.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A vehicular system comprising:
a crankshaft;
a drive shaft;
a plurality of electromagnetic machines coupling the crankshaft to the drive shaft;
a power controller electrically coupled to the plurality of electromagnetic machines and configured to control power flowing through each electromagnetic machine of the plurality of electromagnetic machines;

a supervisory controller communicatively coupled with the power controller and configured to establish an operational mode for the power controller; and a storage device electrically coupled to the power controller to store energy captured by the power controller;

wherein the supervisory controller is configured to direct the power controller to operate the plurality of electromagnetic machines in a vibration suppression mode in which one or more of the electromagnetic machines lower, suppress, or isolate torsional vibrations on the crankshaft.

2. A vehicular system, comprising:

a crankshaft;

a drive shaft;

a plurality of electromagnetic machines coupling the crankshaft to the drive shaft;

a power controller electrically coupled to the plurality of electromagnetic machines and configured to control power flowing through each electromagnetic machine of the plurality of electromagnetic machines;

a supervisory controller communicatively coupled with the power controller and configured to establish an operational mode for the power controller; and a storage device electrically coupled to the power controller to store energy captured by the power controller;

wherein the plurality of electromagnetic machines comprises:

a first electromagnetic machine comprising a first stator armature and a first engine rotor armature driven by the crankshaft;

a second electromagnetic machine comprising a second engine rotor armature driven by the crankshaft and a first drive rotor armature rotatably coupled to the drive shaft; and a third electromagnetic machine comprising a second drive rotor armature rotatably coupled to the drive shaft and a second stator armature; and wherein the first and second stator armatures are fixedly mounted to an internal combustion engine that drives the crankshaft.

3. The system of claim 1, wherein the supervisory controller is configured to direct the power controller in a generator operational mode to operate the plurality of electromagnetic machines to capture energy from torsional vibrations on the crankshaft for storage in the storage device.

4. The system of claim 1, wherein the supervisory controller is configured to direct the power controller in a drive operational mode to apply the captured energy stored in the storage device to one or more of the plurality of electromagnetic machines to drive the drive shaft.

5. The system of claim 4, wherein the supervisory controller is configured to direct the power controller to control an output torque provided on the drive shaft in the drive operational mode.

6. The system of claim 5, wherein the supervisory controller is responsive to a throttle input to determine a desired level of the output torque.

7. A vehicular system, comprising:

a crankshaft;

a drive shaft;

a plurality of electromagnetic machines coupling the crankshaft to the drive shaft;

a power controller electrically coupled to the plurality of electromagnetic machines and configured to control power flowing through each electromagnetic machine of the plurality of electromagnetic machines;

a supervisory controller communicatively coupled with the power controller and configured to establish an operational mode for the power controller; and a storage device electrically coupled to the power controller to store energy captured by the power controller;

wherein the supervisory controller is configured to direct the power controller in a drive operational mode to apply the captured energy stored in the storage device to one or more of the plurality of electromagnetic machines to drive the drive shaft;

wherein the supervisory controller is configured to direct the power controller to control an angular velocity (rpm) of the drive shaft in the drive operational mode.

8. The system of claim 7, wherein the supervisory controller is responsive to a throttle input to determine a desired level of the angular velocity (rpm).

9. The system of claim 4, wherein the supervisory controller is configured to direct the power controller in the drive operational mode to operate at least one of the plurality of electromagnetic machines as a transmission device that allows the crankshaft and the driveshaft to rotate at different angular velocities (rpm).

10. The system of claim 4, wherein the supervisory controller is configured to direct the power controller in the drive operational mode to operate at least one of the plurality of electromagnetic machines as a differential device that allows slippage between the crankshaft and the driveshaft.

11. A vehicular system, comprising:

a crankshaft;

a drive shaft;

a plurality of electromagnetic machines coupling the crankshaft to the drive shaft;

a power controller electrically coupled to the plurality of electromagnetic machines and configured to control power flowing through each electromagnetic machine of the plurality of electromagnetic machines;

a supervisory controller communicatively coupled with the power controller and configured to establish an operational mode for the power controller; and a storage device electrically coupled to the power controller to store energy captured by the power controller;

wherein the supervisory controller is configured to direct the power controller in a drive operational mode to apply the captured energy stored in the storage device to one or more of the plurality of electromagnetic machines to drive the drive shaft;

wherein the supervisory controller is configured to direct the power controller in the drive operational mode to operate a first machine of the plurality of electromagnetic machines to suppress torsional vibration on the crankshaft, to operate a second machine of the plurality of electromagnetic machines to couple power provided by the crankshaft to the drive shaft, and to operate a third machine of the plurality of electromagnetic machines to apply the captured energy to drive the drive shaft.

12. The system of claim 1, wherein the storage device comprises a battery and a capacitor.

13. The system of claim 1, wherein the power controller comprises power electronic circuitry configured to control power provided to, or received from, each electromagnetic machine of the plurality of electromagnetic machines.

14. The system of claim 1, wherein the supervisory controller is configured to direct the power controller in a drive operational mode to operate a first machine of the plurality of electromagnetic machines to suppress the torsional vibration on the crankshaft, and to operate a second machine of the plurality of electromagnetic machines to store energy provided by the crankshaft in the storage device.

15. A vehicular system, comprising:
a crankshaft;
a drive shaft;
a plurality of electromagnetic machines coupling the crankshaft to the drive shaft;
a power controller electrically coupled to the plurality of electromagnetic machines and configured to control power flowing through each electromagnetic machine of the plurality of electromagnetic machines;
a supervisory controller communicatively coupled with the power controller and configured to establish an operational mode for the power controller; and
a storage device electrically coupled to the power controller to store energy captured by the power controller;
wherein the supervisory controller is configured to direct the power controller in an electric-only drive operational mode to apply the captured energy stored in the storage device to one or more of the plurality of electromagnetic machines to drive the drive shaft without any power provided by the crankshaft.

16. The system of claim 1, wherein the plurality of electromagnetic machines are disposed in a laterally sequential arrangement in which respective armatures of adjacent electromagnetic machines of the plurality of electromagnetic machines are disposed relative to one another frontally.

17. A vehicular system, comprising:
a crankshaft;
a drive shaft;
a plurality of electromagnetic machines coupling the crankshaft to the drive shaft;
a power controller electrically coupled to the plurality of electromagnetic machines and configured to control power flowing through each electromagnetic machine of the plurality of electromagnetic machines;
a supervisory controller communicatively coupled with the power controller and configured to establish an operational mode for the power controller; and
a storage device electrically coupled to the power controller to store energy captured by the power controller;
wherein the plurality of electromagnetic machines are disposed in a concentric arrangement in which respective armatures of adjacent electromagnetic machines of the plurality of electromagnetic machines are disposed relative to one another radially.

18. The system of claim 1, wherein the plurality of electromagnetic machines are disposed in a sequential arrangement in which respective armatures of adjacent electromagnetic machines of the plurality of electromagnetic machines are disposed relative to one another radially.

19. The system of claim 1, wherein:
a first respective two electromagnetic machines of the plurality of electromagnetic machines are disposed in a concentric arrangement in which respective armatures of the first two electromagnetic machines are disposed relative to one another radially; and
a second two electromagnetic machines of the plurality of electromagnetic machines are disposed in a laterally sequential arrangement in which respective armatures of the second two machines are disposed relative to one another frontally.

20. The system of claim 1, wherein the supervisory controller is configured to direct the power controller in a drive operational mode to operate a first machine of the plurality of electromagnetic machines to couple power provided by the crankshaft to the drive shaft, and to operate a second machine of the plurality of electromagnetic machines to store energy provided by the crankshaft in the storage device.

21. The system of claim 1, wherein:
a first two electromagnetic machines of the plurality of electromagnetic machines are disposed in a laterally sequential arrangement in which respective armatures of the first two machines are disposed relative to one another frontally; and
a second two electromagnetic machines of the plurality of electromagnetic machines are disposed in a sequential arrangement in which respective armatures of the second two electromagnetic machines are disposed relative to one another radially.

22. A vehicular system comprising:
a crankshaft;
a drive shaft;
a plurality of electromagnetic machines coupling the crankshaft to the drive shaft;
a power controller electrically coupled to the plurality of electromagnetic machines and configured to control power flowing through each electromagnetic machine of the plurality of electromagnetic machines;
a supervisory controller communicatively coupled with the power controller and configured to establish an operational mode for the power controller; and
a storage device electrically coupled to the power controller to store energy captured by the power controller;
wherein at least two of the plurality of electromagnetic machines are disposed in a laterally sequential arrangement in which respective armatures of the at least two electromagnetic machines are disposed relative to one another frontally.

* * * * *